June 27, 1933.  L. W. CAMPBELL  1,915,920
MILL
Filed Sept. 11, 1929  2 Sheets-Sheet 2
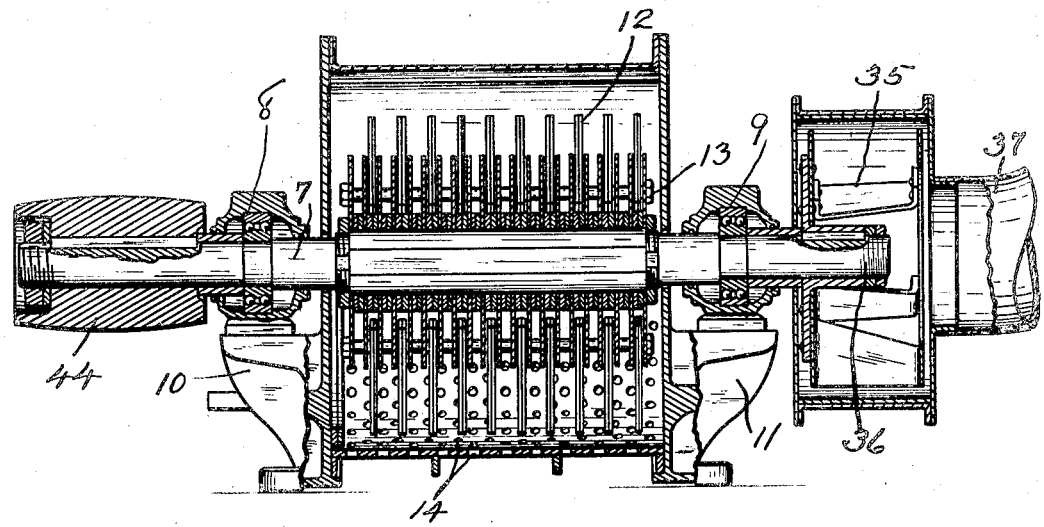
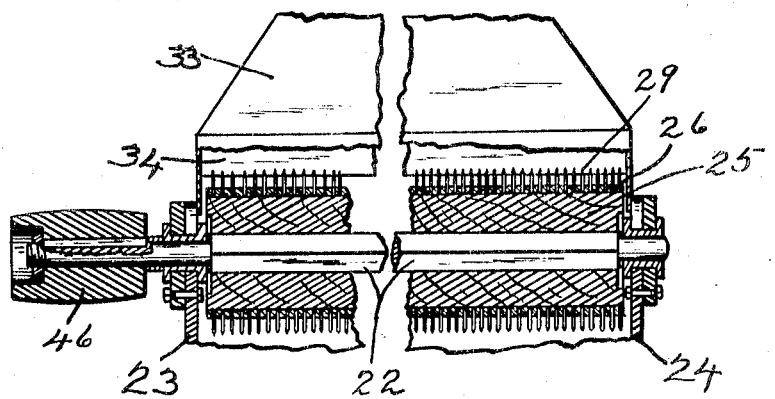
INVENTOR
Leon W. Campbell
BY
WITNESS
J.T. Mains
ATTORNEYS Patented June 27, 1933

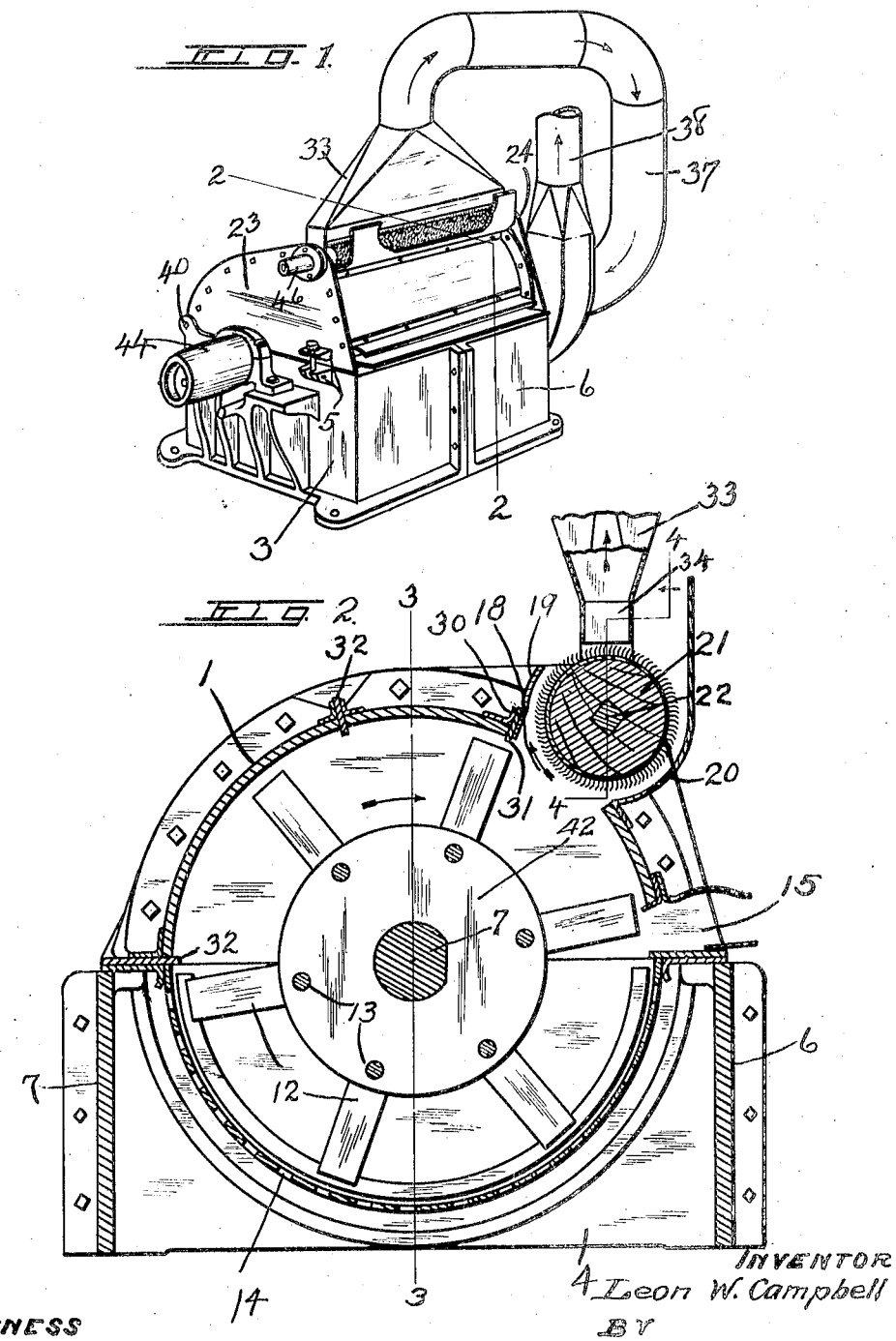

1,915,920

UNITED STATES PATENT OFFICE

LEON W. CAMPBELL, OF ATLANTA, GEORGIA, ASSIGNOR TO J. B. SEDBERRY INC., OF UTICA, NEW YORK, A CORPORATION OF NEW YORK

MILL

Application filed September 11, 1929. Serial No. 391,787.

This invention relates to certain new and useful improvements in mills and more specifically to a mill for separating cotton fibre from any substance to which it may be attached or with which it may be mixed as, for instance, in the treatment of cotton motes, cotton waste, cotton sweepings, cotton seed hulls, etc.

The main objects of the invention is the production of a mill having a comparatively large capacity and which will produce a relatively high grade of cotton in an efficient and comparatively cheap and effective manner.

Other objects and advantages relate to the details of the structure and the form and relation of the parts thereof, all as will more fully appear from the following description taken in connection with the accompanying drawings in which:—

Figure 1 is a perspective view of a mill of this invention.

Figure 2 is a section on line 2—2, Figure 1.

Figure 3 is a section on line 3—3, Figure 2.

Figure 4 is a section on line 4—4, Figure 2.

The apparatus, as illustrated, comprises to a considerable extent a standard form of mill used for many years for various purposes and the particular feature of invention here claimed resides in the provision of a novel means in the form of a cleaner roll for separating the fibre during its movement in the mill from the other substance or substances with which it may be mixed or to which it may be attached, and removing the cotton from the mill without the use of induced air currents which are objectionable for various reasons as, for instance, removing other material combined with the fibre or cotton and tending to prevent the ejecting of the other material by centrifugal force through openings in the mill provided for that purpose.

The mill comprises the usual cylinder 1 which may be formed in two substantially half sections, the upper one of which may be pivotally secured by rod 40 to end walls 3 and 4 which close and are secured to the opposite ends of the lower half of the cylinder.

Clamping means 5 is provided for maintaining the parts rigidly in assembled condition when in use.

Front and rear walls 6 and 7 may be provided formed integrally with or secured in any manner to the end walls 3 to form a box-like base within which the lower portion of the cylinder 1 is positioned.

A drive shaft 7 extends through the end walls 3 axially of the cylinder 1 and may be journaled in suitable bearings 8 and 9 mounted on the brackets 10 and 11 projecting outwardly from respective end walls 3 and 4.

This shaft may be non-circular in form within the cylinder so that when the disks 42 having a central opening of similar form are mounted on the shaft they will rotate with the shaft.

A plurality of sets of these disks are mounted on the shaft 7, the disks of each set being separated from each other a desired distance and the sets of disks also being separated from each other a desired distance.

Between each set of disks are positioned one or more blades or hammers 12 which may be of any desired form but as here shown are of rectangular shape having their inner ends pivotally mounted on cross rods 13 so that the bars or hammers are free to swing on the cross rods between the respective sets of disks.

As shown, six of these cross rods are shown extending through all of the disks and secured at their ends in any suitable manner as, for instance, by nuts or the like.

With this structure, six radial sets of blades or hammers 12 are provided mounted on the respective cross rods 13. Normally these blades swing by gravity when the structure is not in use, but upon rotation of the built up rotor on shaft 7, they are thrown radially outwardly by centrifugal force.

As shown, the bottom half of cylinder 1 is provided with a multiplicity of perforations 14 of desired size in accordance with the material to be treated and the desired result.

The upper portion of cylinder 1 is provided with an elongated opening 18 extending throughout substantially the entire length of cylinder 1 and guard plates 19 and 20 may be provided extending outwardly from the cylinder 1, at opposite side of the opening 18.

Preferably, this opening is provided at a point in the periphery of the cylinder as near the feed opening 15 as is practicable to permit the treated material to pass throughout as near as possible, the entire circumference of the cylinder before it comes to the cleaner roll 21 which is positioned between the guard plates 19 and 20.

This cleaner roll is formed of a shaft 22 journaled in the upper portion of the opposite end walls 23 and 24 for the upper half of cylinder 1. On this shaft is mounted a roll 25 in such a manner as to rotate with the shaft.

The exterior of the roll is provided with a multiplicity of relatively fine needles 29 or metallic bristles projecting radially outwardly and having their outer ends turned or bent in the direction of rotation of the cleaner roll. These needles may be mounted on the roll 25 in any suitable manner as, for instance, they may be vulcanized in a suitably shaped piece of rubber 26 which is wound around and secured to the roll 25 or they may be secured in any manner in a suitably shaped sheet of leather or other material applicable to the purpose as the exact method of securing the needles to the roll may be accomplished in various manners. The cleaner roll is so positioned that the needles approach but do not contact with the adjacent guard plates and the needles during rotation preferably do not project with the cylinder but extend only to the inner periphery of the cylinder 1 if projected across opening 18.

The rotor consisting of disks 42, blades 12 and associated structure is rotated at comparatively high speed in the direction indicated by the arrows in Figure 2, as for instance, a speed of two or three thousand rotations per minute or even higher speeds, whereas the cleaner roll rotates in the opposite direction at a comparatively low rate of speed, as for instance, five hundred rotations per minute so that the material treated is carried around the cylinder between blades, thrown outwardly toward the interior surface of the cylinder and the cotton fibre is collected by the needles 29 and carried out of the mill while the material from which the cotton fibre is separated is thrown out centrifugally through the perforations or openings 14 into the base of the mill.

The needles being bent in the direction of rotation of the cleaner roll, cling to the cotton fibre in spite of the moving action of the blades 12 and permit the onward passage of the blades 12 and permit the onward passage of the other material, and this operation is assisted by the fact that a bar 30 is provided extending lengthwise of the cylinder 1 at a point adjacent the opening 18 and this bar has a portion 31 projecting a short distance into the chamber in the cylinder 1 forming an inwardly projecting shoulder which acts to throw the material treated inwardly of the cylinder at a point adjacent the cleaner roll.

Further, as shown, additional bars 32 are provided at spaced points around the cylinder all of which act to cause material treated to move inwardly where it is more effectively subjected to the action of the blades 12.

Any suitable means may be provided for removing or combing the cotton fibre from the cleaner roll. A perhaps preferable method consists in sucking or drawing the cotton fibre from the needles 29 at a point outside the cylinder 1 and for this purpose I have shown a hood 33 terminating in a narrow elongated suction opening 34 disposed adjacent the roll just beyond the extension of the needles at a point outside the cylinder 1.

Only a light suction is needed and this is provided for by means of a fan 35 mounted on the projecting end 36 of shaft 7, the inlet to the fan being connected by pipe 37 with the hood 33.

The outlet to the fan may feed into a pipe 38 leading to any suitable place for further treatment or disposal of the fibre.

The shaft 7 is shown as provided with a pulley 44 for driving shaft from any suitable source at the desired speed and in like manner, the shaft 22 is shown as provided with a pulley 46 for driving it at the desired speed.

Separate source of power may be utilized for driving the respective pulleys or proper connections may be made for driving the shafts at their different relative speed and in opposite directions from the same source of power, and although I have shown and described, a specific form and construction of apparatus, I do not desire to restrict myself to the details of form, construction or arrangement as various changes and modifications may be made within the scope of the appended claims.

I claim:

1. A fiber-preparing device comprising in combination, a cylinder having inlet and outlet openings in the wall thereof, said openings being positioned at one side of the cylinder and spaced not more than forty-five degrees apart, a rotor within the cylinder and including a plurality of blades, means for rotating said rotor to move the blades past said openings, a rotary cleaner roll disposed adjacent the outlet opening for removing certain of the treated fiber, a hood adjacent the cleaner roll, and means for producing suction in the hood to withdraw material from the cleaner roll.

2. A fiber-preparing device comprising in combination, a cylinder composed of two half sections, one of said sections being provided with a plurality of perforations for permitting exit of material and the other section having inlet and outlet openings and a plurality of longitudinally extending inwardly projecting shoulders adapted to deflect material inwardly away from said openings, a rotor in the cylinder adapted to agitate the material contained therein, and means for rotating said rotor.

In witness whereof I have hereunto set my hand this 31st day of August, 1929.

LEON W. CAMPBELL.